US011216253B2

(12) United States Patent
Gross et al.

(10) Patent No.: US 11,216,253 B2
(45) Date of Patent: Jan. 4, 2022

(54) APPLICATION PROTOTYPING TOOL

(71) Applicant: Kony, Inc., Orlando, FL (US)

(72) Inventors: Edward Gross, Orlando, FL (US);
Destry Gustin, Oviedo, FL (US);
Komandur Rajendra Kumar,
Hyderabad (IN); Pattabhi Rama Rao Dasari, Hyderabad (IN); Matthew B. Trevathan, Roswell, GA (US); Prajakt Deshpande, Hyderabad (IN); Raj K. Koneru, Windermere, FL (US);
Sathyanarayana Vennapusala,
Hyderabad (IN)

(73) Assignee: KONY, INC., Orlando, FL (US)

( * ) Notice: Subject to any disclaimer, the term of this patent is extended or adjusted under 35 U.S.C. 154(b) by 0 days.

(21) Appl. No.: 14/506,112

(22) Filed: Oct. 3, 2014

(65) Prior Publication Data

US 2016/0098250 A1 Apr. 7, 2016

(51) Int. Cl.
*G06F 8/20* (2018.01)
*G06Q 10/10* (2012.01)
(Continued)

(52) U.S. Cl.
CPC ............... *G06F 8/20* (2013.01); *G06F 8/34* (2013.01); *G06F 8/38* (2013.01); *G06F 16/9577* (2019.01);
(Continued)

(58) Field of Classification Search
CPC ..... G06F 8/20; G06F 8/30; G06F 8/34; G06F 8/35; G06F 8/38; G06F 8/40;
(Continued)

(56) References Cited

U.S. PATENT DOCUMENTS 8,006,224 B2   8/2011  Bateman et al.
8,046,694 B1 * 10/2011  Lappas .................. G06Q 30/04
                                                                  715/733

(Continued)

OTHER PUBLICATIONS

CSS Reference, w3schools.com, 2011, 9 pages, [retrieved on Dec. 29, 2020], Retrieved from the Internet: <URL:https://web.archive.org/web/20111001012517/http://www.w3schools.com/cssref/default.asp>.*

(Continued)

*Primary Examiner* — Geoffrey R St Leger
(74) *Attorney, Agent, or Firm* — Andrew M. Calderon; Roberts Calderon Safran & Cole, P.C.

(57) ABSTRACT

Systems and processes for prototyping and designing natively rendered multi-channel applications across diverse platforms are disclosed. The method of prototyping an application with a computing device includes providing a library of native design elements which are reproducible in different design layouts on an interface associated with different, predefined platforms. The method further includes converting a first design layout comprising one or more native design elements which fits within an interface associated with a first platform of the different, predefined platforms to a second design layout comprising the one or more native design elements which fits within an interface associated with a second platform of the different, predefined platforms, and which is in proportion to the first design layout.

18 Claims, 8 Drawing Sheets

(51) Int. Cl.
*G06F 16/957* (2019.01)
*G06F 40/169* (2020.01)
*G06F 8/34* (2018.01)
*G06F 8/38* (2018.01)
*G06F 3/0486* (2013.01)

(52) U.S. Cl.
CPC ......... *G06F 40/169* (2020.01); *G06Q 10/101* (2013.01); *G06F 3/0486* (2013.01)

(58) Field of Classification Search
CPC .............. G06F 9/4443; G06F 9/44536; G06F 9/44542; G06F 9/455
USPC ....... 717/101, 105, 109, 113, 121, 134, 135, 717/138
See application file for complete search history.

(56) References Cited

U.S. PATENT DOCUMENTS

| | | | | |
|---|---|---|---|---|
| 8,813,024 | B2 | 8/2014 | Akkiraju et al. | |
| 8,938,679 | B1* | 1/2015 | Hsu | G06F 3/0486 715/230 |
| 9,251,169 | B2* | 2/2016 | Smith | G06T 11/001 |
| 9,529,696 | B2* | 12/2016 | Johnson | G06F 11/3664 |
| 2011/0154287 | A1* | 6/2011 | Mukkamala | G06F 8/20 717/105 |
| 2013/0205277 | A1* | 8/2013 | Seven | G06F 8/38 717/121 |
| 2014/0019891 | A1 | 1/2014 | Borah | |
| 2014/0204125 | A1* | 7/2014 | Smith | G06T 11/001 345/641 |
| 2015/0346982 | A1* | 12/2015 | Johnson | G06F 11/3664 715/763 |

OTHER PUBLICATIONS

Cascading Style Sheet Quick Guide, mobilefish.com, 2011, 9 pages, [retrieved on Dec. 29, 2020], Retrieved from the Internet: <URL: https://web.archive.org/web/20110824160850/https://www.mobilefish.com/tutorials/css/css_quickguide_div_style_attribute.html>.*
Mokil, A Guide to Mobile Emulators, mobileforge.com, 2009, 44 pages, [retrieved on May 14, 2021], Retrieved from the Internet: <URL: https://mobiforge.com/design-development/a-guide-mobile-emulators>.*
Holzmann, C., et al., Building Interactive Prototypes of Mobile User Interfaces with a Digital Pen, APCHI '12: Proceedings of the 10th asia pacific conference on Computer human interaction, Aug. 2012, pp. 159-168, [retrieved on Aug. 16, 2021], Retrieved from the Internet: <URL:http://dl.acm.org/>.*
International Search Report on International Application No. PCT/US2015/053791 dated Dec. 28, 2015, 2 pages.
Palmieri et al., Comparison of Cross-Platform Mobile Development Tools, https://www.researchgate.net/publication/261315380_Comparison_of_cross-platform_mobile_development_tools, Oct. 2012, 1-9.
International Preliminary Report on International Application No. PCT/US2015/053791 dated Apr. 4, 2017,1 page.
Written Opinion of the International Search Report on International Application No. PCT/US2015/053791 dated Dec. 28, 2015, 5 pages.

* cited by examiner

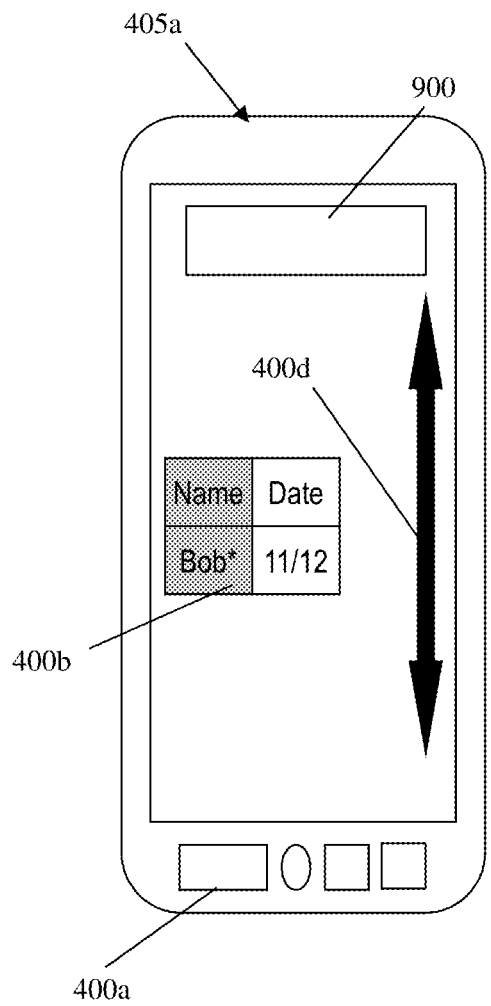
FIG. 10
FIG. 9
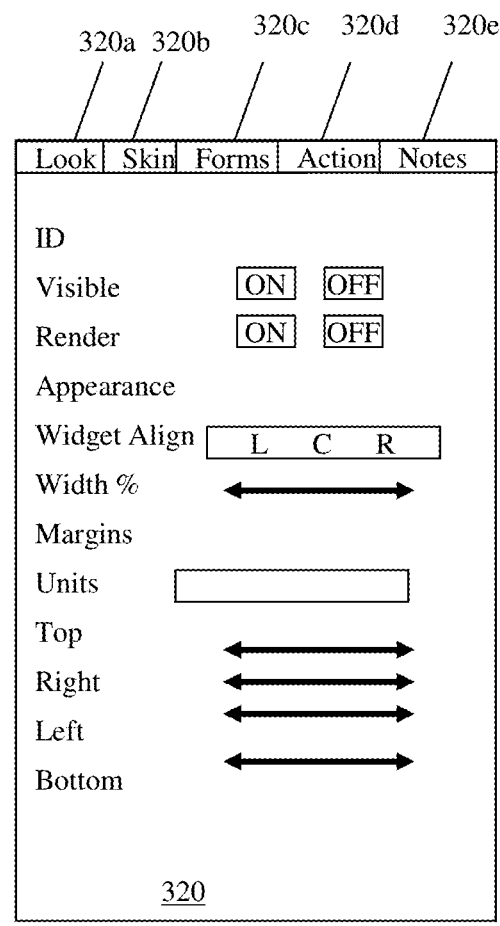

APPLICATION PROTOTYPING TOOL

FIELD OF THE INVENTION

The invention relates to a cross platform application prototyping tool and, more particularly, to systems and processes for prototyping and designing natively rendered multi-channel applications across diverse platforms.

BACKGROUND OF THE INVENTION

Prototyping tools allow a design to mock-up design layouts for mobile applications, web pages and the like. These tools have the capabilities to wire-frame applications, as well as provide design cues, etc.; however, current prototyping tools do not have a way of exporting a mobile prototype into a mobile development framework. Therefore, developers need to recreate visual assets directly within the developer's workbench. Often, pieces of visual functionality, formatting and styling are lost in this process creating bugs on the front end of the application that could be easily resolved if the designer's intent can be pushed into a development tool.

SUMMARY OF THE INVENTION

In a first aspect of the invention, a method of prototyping an application with a computing device, comprises providing a library of native design elements which are reproducible in different design layouts on an interface associated with different, predefined platforms. The method further comprises converting a first design layout comprising one or more native design elements which fits within an interface associated with a first platform of the different, predefined platforms to a second design layout comprising the one or more native design elements which fits within an interface associated with a second platform of the different, predefined platforms, and which is in proportion to the first design layout.

In another aspect of the invention, a method comprises: representing a design layout with native design elements on a canvas provided on a first computing device regardless of platform and which can be natively rendered on a second computer device; and transferring the design layout with the native design elements to the second computing device to natively render the native design elements as a functional prototype application in its interface.

In yet another aspect of the invention, a computer system for generating functional prototype applications in different platforms without rewriting code for each different platform comprises a hardware memory device that stores program instructions, and a processor that executes the program instructions and causes the computer system to: design, modify, and update design layouts for prototype applications using a library of native design elements, which are visually rendered with its related functionality in a relative layout on a canvas of different platforms; navigate between different pages of the prototype application; publish the design layouts for the prototype applications with the native design elements; and associate comments with specific native design elements for which it pertains and share the comments amongst different computing devices including a native computing device which renders the native device elements as a functional prototype application.

BRIEF DESCRIPTION OF THE DRAWINGS

The present invention is described in the detailed description which follows, in reference to the noted plurality of drawings by way of non-limiting examples of exemplary embodiments of the present invention.

FIGS. 3-10 show various displays of a cross platform application prototyping tool and its underlying functionality in accordance with the present invention.

DETAILED DESCRIPTION OF THE INVENTION

Figure 1:
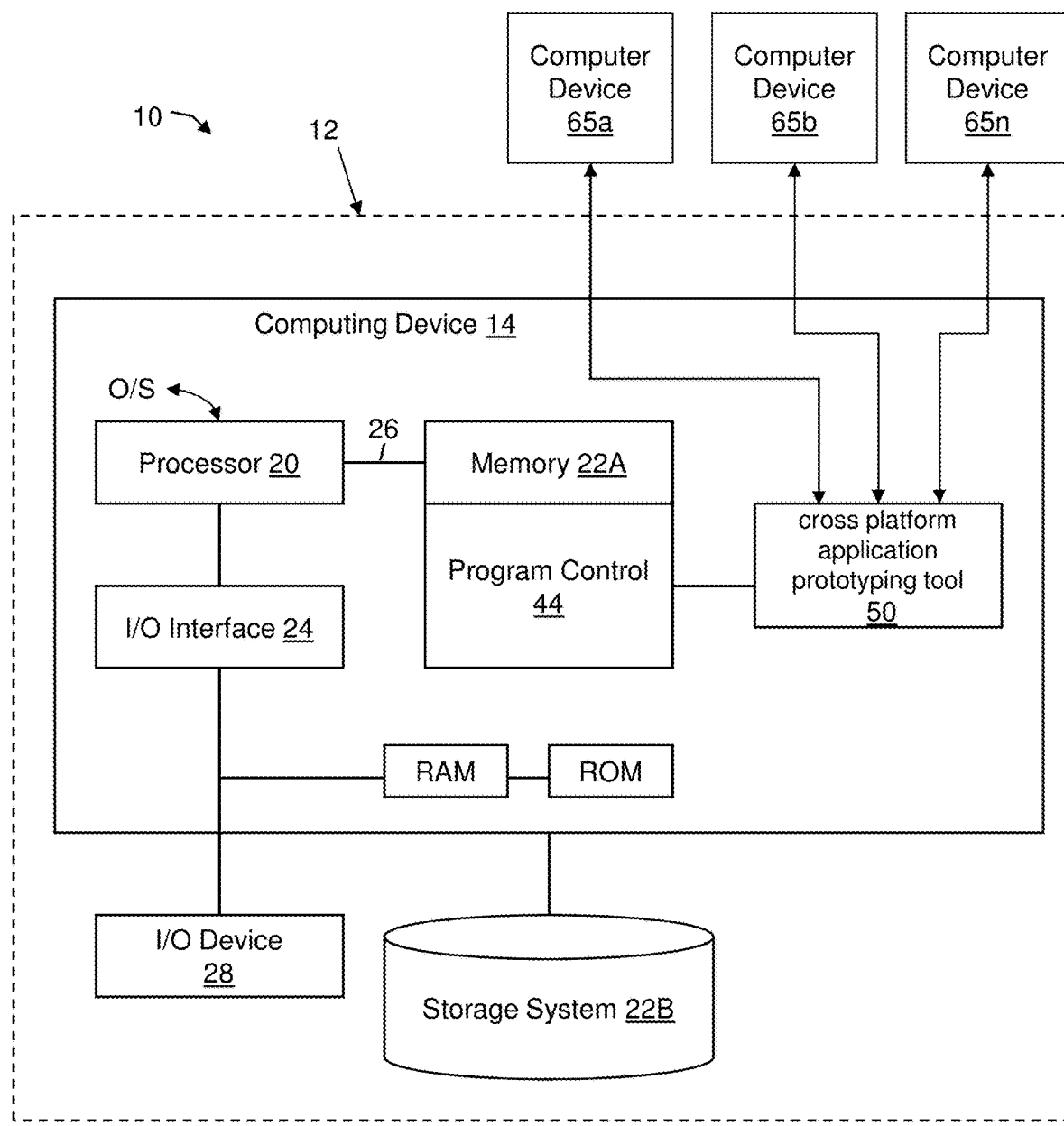
FIG. 1 is an illustrative environment for implementing the processes in accordance with aspects of the invention.

The invention relates to a cross platform application prototyping tool and, more particularly, to systems and processes for prototyping and designing natively rendered multi-channel applications across diverse platforms (e.g., mobile and web based platforms). Advantageously, by implementing the processes and system of the present invention, the prototyping and designing of the natively rendered multi-channel applications can be provided with a single visualization tool, which provides the functionality and ability to collaboratively design and develop a single mobile application for different platforms, e.g., operating systems (O/S, Android, etc. and different device types (tablets, etc.), without the need to rewrite code for each platform specific application.

More specifically, by using a library of native form factors or native design elements (hereinafter referred to as native design elements), e.g., widgets, skins, themes, backgrounds, buttons, scrolls, workflow processes and/or other user interface frameworks including applications (e.g., cameras, maps, etc.), etc., and customization tools, the cross platform application prototyping tool allows the designer to select, drag and drop any number of predefined native design elements with their underlying functionality into a virtual interface (canvas) associated with a certain platform, i.e., operating system and device type. Then, by simply selecting from a menu of different platforms, the cross platform application prototyping tool can automatically import the native design elements and their underlying functionality into a virtual interface associated with another platform, e.g., from an Android® operating system operating on a Galaxy® mobile device to an iOS operating system operating on an Apple® iPhone®. The cross platform application prototyping tool will automatically reformat the layout of the native design elements for the virtual interface of the second platform, without the need to recode the native design elements for the second platform.

In further embodiments, the designer can customize the native design elements for any platform by changing, e.g., skins, themes, locations of widgets, or other properties of the native design elements, with a simple set of commands including editing commands specialized for the particular native design element. For example, the cross platform application prototyping tool can drag and drop a camera application into the virtual interface (canvas), where any property of the camera can be customized for the particular platform, e.g., access mode, compression, overlay, etc. Once the designer is complete with any stage of the design, it can then be uploaded to a server and subsequently launched on a client's mobile device where the design layout will be natively rendered as a functional prototype application on a specific platform. In this way, the cross platform application prototyping tool assists designers in implementing fully functional natively rendered applications for different platforms, without the need to understand these different platforms.

Also, by implementing the systems and processes of the present invention, the developer no longer needs to recreate code for different platform specific mobile applications. By not having to recreate code for each platform specific application, the systems and processes of the present invention will ensure consistency of product throughout different platforms while minimizing coding errors thus saving considerable time and resources. Accordingly, as the developer no longer needs to recreate code for an application over different platforms, the possibility of coding errors (bugs) late in the design and development life cycle can be significantly reduced or eliminated.

Moreover, the cross platform application prototyping tool provides the functionality and ability of the designer, developer and client to collaboratively design and develop applications in real-time. This collaboration, in real-time, allows the users (e.g., designer, developer and client) to identify bugs, defects and enhance native design elements at any stage of application design. This, in turn, allows the application to meet business requirements earlier in the design process, for multiple platforms. For example, the layout of the designed application, e.g., the native design elements and their underlying functionality, etc. (as already coded by the cross platform application prototyping tool), can be uploaded to a server, for subsequent launch by a mobile device using any platform with comments that can be directly tied to a particular native design element. These comments can be provided by any of the designer, developer and/or the client from the mobile device, and viewed by any of the users, with a direct tie to the particular native design element for which it pertains. Thus, the native design elements for the application will be natively rendered on the mobile device, allowing the user to fully test and comment on the layout of the design for any platform specific application. In this way, debugging and enhancement of design formats can be achieved at any stage of design.

System Environment

The present invention may be embodied as a system, method or computer program product. The present invention may take the form of a hardware embodiment, a software embodiment or a combination of software and hardware. Furthermore, the present invention may take the form of a computer program product embodied in any tangible storage medium of expression having computer-usable program code embodied in the medium. The computer-usable or computer-readable medium is not a transitory signal per se, and is any medium that can contain and store the program for use by or in connection with an instruction execution system, apparatus, or device. The computer-usable or computer-readable medium may be, for example, an electronic, magnetic, optical, electromagnetic, infrared, or semiconductor system, apparatus, or device.

FIG. 1 shows an illustrative environment 10 for managing the processes in accordance with the invention. The environment 10 includes a server 12 or other computing system. The server 12 can be a business enterprise that stores data in a storage system 22B, which data may be accessed by users of user mobile computer devices 65a, 65b, . . . 65n. In embodiments, the server 12 can be a standalone server, which implements the processes of the present invention within a networking environment. That is, the server 12 and/or processes performed by the server 12 can be integrated into the networking environment of any enterprise.

The server 12 includes a computing device 14 which can be resident on a network infrastructure or computing device. The computing device 14 includes a processor 20 (e.g., a CPU), a memory 22A, an I/O interface 24, and a bus 26. The bus 26 provides a communications link between each of the components in the computing device 14. In addition, the computing device 14 includes a random access memory (RAM), a read-only memory (ROM), and an operating system (0/S). The computing device 14 is in communication with the external I/O device/resource 28 and a storage system 22B. The I/O device 28 can comprise any device that enables an individual to interact with the computing device 14 (e.g., user interface) or any device that enables the computing device 14 to communicate with one or more other computing devices (e.g., devices 65a-n, etc.) using any type of communications link. The storage system 22B can store data such as one or more databases which can be maintained, for example, by an enterprise administrator.

The processor 20 executes computer program code (e.g., program control 44), which can be stored in the memory 22A and/or storage system 22B. In embodiments, the program control 44 controls a cross platform application prototyping tool 50, which comprises an application that is adapted to perform one or more of the processes described herein. The cross platform application prototyping tool 50 can be implemented as one or more program code in the program control 44 stored in memory 22A as separate or combined modules. Additionally, the cross platform application prototyping tool 50 may be implemented as separate dedicated processors or a single or several processors to provide the functions described herein. While executing the computer program code, the processor 20 can read and/or write data to/from memory 22A, storage system 22B, and/or I/O interface 24. In this manner, the program code executes the processes of the invention. The storage system 22B can be, for example, a database which stores a library of native design elements, e.g., widgets, skins, themes, backgrounds, buttons, scrolls, workflow processes and/or other user interface frameworks including applications (e.g., cameras, maps, etc.), etc., and customization tools, in an XML or JavaScript (JS) language for subsequent native rendering on any platform, e.g., operating system and particular type of device.

The program code can include computer program instructions which are stored in a computer readable storage medium. The computer program instructions may also be loaded onto a computer, other programmable data processing apparatus, or other devices to cause a series of operational steps to be performed on the computer. Moreover, any methods provided herein in the form of flowcharts, block diagrams or otherwise may be implemented using the computer program instructions, implemented on the computer readable storage medium.

The computer readable storage medium comprises, for example, any non-transitory signal per se, such as electronic, magnetic, optical, electromagnetic, infrared, and/or semiconductor system. More specific examples (a non-exhaustive list) would include: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any combination thereof. Accordingly, the computer readable storage medium may be any tangible medium that can contain or store a program for use by or in connection with an instruction execution system, apparatus, or device of the present invention.

In embodiments, the cross platform application prototyping tool 50 implements the processes of the present invention. By implementing the processes provided by the cross platform application prototyping tool 50, it is possible to implement consistent designs for a single application on different platforms with a single tool; that is, there is no longer a need develop (code) platform specific applications, separately. Instead, the platform application prototyping tool 50 provides the functionality to prototype natively rendered applications for different platforms, export these prototype applications into a development tool for the developer to finalize any design layout, and to launch these applications natively rendered onto a mobile device for testing, comment, design layout, etc. The developer can reuse the style guides for any platform, based on the underlying logic of the design.

More specifically, the cross platform application prototyping tool 50 is a cloud based tool which is a collaborative multichannel application tool providing the designer the ability to design a single functional application with native design elements, e.g., widgets, skins, themes, backgrounds, buttons, scrolls, workflow processes and/or other user interface frameworks including applications (e.g., cameras, maps, etc.), etc., for multiple platforms. The design of the single functional application can be natively rendered on different platforms without rewriting code or having any understanding for different platforms, e.g., O/S, Android, tablets, etc. In this way, the cross platform application prototyping tool 50 provides the designer the functionality to create fully functional applications on the computing device 14 (which can be natively rendered on a mobile device of different platforms), visualize the applications for different platforms and have the design layout rendered natively on any device (with any operating system) at any stage in the development cycle.

In embodiments, the cross platform application prototyping tool 50 can create and share the fully functional application on different platforms by using a library of predefined library of native design elements, e.g., widgets, skins, themes, backgrounds, buttons, scrolls, workflow processes and/or other user interface frameworks including applications (e.g., cameras, maps, etc.), etc., and customization tools. In embodiments, the library of predefined native design elements are provided in XML and/or JavaScript (JS) code, which allow the design layout and underlying functionality of the application to be natively rendered on different platforms and to be visualized on the designer's computing device, e.g., computing device 14, in a virtual interface (canvas) of any specific platform, e.g., Android, iOS, etc. The cross platform application prototyping tool 50 will automatically reformat the design layout for any platform in the virtual interface (canvas).

In embodiments, by using a library of native design elements pre-coded with underlying XML and/or JS, the cross platform application prototyping tool 50 can drag and drop any number of native design elements in a virtual interface to create, modify and develop any number of design layouts and underlying functionality for a single application capable of being natively rendered on any defined platform. The cross platform application prototyping tool 50 also provides the designer the ability to layer the native design elements on top of each other for a click through experience. In this way, the designer has the ability to click through the application so that the designer can observe any aspect or interactions of the design layout through multiple pages or click-throughs for a particular application. This can be used to provide native device optimization, by ensuring that the design features are formatted and functional over any number of different platforms.

By way of more specific example, the library of native design elements can be pre-coded as an XML based language such as, e.g., CSS, which is a style sheet language used for describing the look and formatting of a document written in a markup language, e.g., HTML, XHTML, XML, SVG and XUL. By using CSS (or other XML based language, for example), it is possible to separate the document content from document presentation, including elements such as the layout, colors, fonts and other native design elements as defined herein. For example, XML language or other markup language that defines a set of rules for encoding documents can be used to generate code for different properties (weight, opacity, format, font, color, size, etc.) and layouts, for native rendering of applications on different platforms, as well as to visualize the native design elements in the design layout on different platforms on the display of the computing device 14 by simply selecting the desired platform from the cross platform application prototyping tool 50. These different properties and formats can include, amongst others, color, weight, opacity, format, font, size, background, border properties, etc., and layouts, and other native design elements described herein.

More specifically, the following tables provide illustrative examples of using CSS to create user interface frameworks, workflow processes, designs (e.g., colors, fill effects, layouts, sizes and formats, etc.) and other properties for fully functional natively rendering of applications on different platforms, using a single integrated tool. It should be understood by those of skill in the art that the following tables are merely illustrative examples, and that other examples using XML or JS are also contemplated by the present invention.

| Color Properties | | |
| --- | --- | --- |
| Property | Description | CSS |
| color | Sets the color of text | 1 |
| opacity | Sets the opacity level for an element | 3 |

| Background and Border Properties | | |
| --- | --- | --- |
| Property | Description | CSS |
| background | Sets all the background properties in one declaration | 1 |
| background-attachment | Sets whether a background image is fixed or scrolls with the rest of the page | 1 |
| background-color | Sets the background color of an element | 1 |
| background-image | Sets the background image for an element | 1 |
| background-position | Sets the starting position of a background image | 1 |
| background-repeat | Sets how a background image will be repeated | 1 |
| background-clip | Specifies the painting area of the background | 3 |

-continued

Background and Border Properties

| Property | Description | CSS |
| --- | --- | --- |
| background-origin | Specifies the positioning area of the background images | 3 |
| background-size | Specifies the size of the background images | 3 |
| border | Sets all the border properties in one declaration | 1 |
| border-bottom | Sets all the bottom border properties in one declaration | 1 |
| border-bottom-color | Sets the color of the bottom border | 1 |
| border-bottom-left-radius | Defines the shape of the border of the bottom-left corner | 3 |
| border-bottom-right-radius | Defines the shape of the border of the bottom-right corner | 3 |
| border-bottom-style | Sets the style of the bottom border | 1 |
| border-bottom-width | Sets the width of the bottom border | 1 |
| border-color | Sets the color of the four borders | 1 |
| border-image | A shorthand property for setting all the border-image-* properties | 3 |
| border-image-outset | Specifies the amount by which the border image area extends beyond the border box | 3 |
| border-image-repeat | Specifies whether the image-border should be repeated, rounded or stretched | 3 |
| border-image-slice | Specifies the inward offsets of the image-border | 3 |
| border-image-source | Specifies an image to be used as a border | 3 |
| border-image-width | Specifies the widths of the image-border | 3 |
| border-left | Sets all the left border properties in one declaration | 1 |
| border-left-color | Sets the color of the left border | 1 |
| border-left-style | Sets the style of the left border | 1 |
| border-left-width | Sets the width of the left border | 1 |
| border-radius | A shorthand property for setting all the four border-*-radius properties | 3 |
| border-right | Sets all the right border properties in one declaration | 1 |
| border-right-color | Sets the color of the right border | 1 |
| border-right-style | Sets the style of the right border | 1 |
| border-right-width | Sets the width of the right border | 1 |
| border-style | Sets the style of the four borders | 1 |
| border-top | Sets all the top border properties in one declaration | 1 |
| border-top-color | Sets the color of the top border | 1 |
| border-top-left-radius | Defines the shape of the border of the top-left corner | 3 |
| border-top-right-radius | Defines the shape of the border of the top-right corner | 3 |
| border-top-style | Sets the style of the top border | 1 |
| border-top-width | Sets the width of the top border | 1 |
| border-width | Sets the width of the four borders | 1 |
| box-decoration-break | Sets the behavior of the background and border of an element at page-break, or, for in-line elements, at line-break. | 3 |
| box-shadow | Attaches one or more drop-shadows to the box | 3 |

Basic Box Properties

| Property | Description | CSS |
| --- | --- | --- |
| bottom | Specifies the bottom position of a positioned element | 2 |
| clear | Specifies which sides of an element where other floating elements are not allowed | 1 |
| clip | Clips an absolutely positioned element | 2 |
| display | Specifies how a certain HTML element should be displayed | 1 |
| float | Specifies whether or not a box should float | 1 |
| height | Sets the height of an element | 1 |
| left | Specifies the left position of a positioned element | 2 |
| overflow | Specifies what happens if content overflows an element's box | 2 |
| overflow-x | Specifies whether or not to clip the left/right edges of the content, if it overflows the element's content area | 3 |
| overflow-y | Specifies whether or not to clip the top/bottom edges of the content, if it overflows the element's content area | 3 |
| padding | Sets all the padding properties in one declaration | 1 |
| padding-bottom | Sets the bottom padding of an element | 1 |
| padding-left | Sets the left padding of an element | 1 |
| padding-right | Sets the right padding of an element | 1 |
| padding-top | Sets the top padding of an element | 1 |
| position | Specifies the type of positioning method used for an element (static, relative, absolute or fixed) | 2 |
| right | Specifies the right position of a positioned element | 2 |
| top | Specifies the top position of a positioned element | 2 |
| visibility | Specifies whether or not an element is visible | 2 |
| width | Sets the width of an element | 1 |
| vertical-align | Sets the vertical alignment of an element | 1 |
| z-index | Sets the stack order of a positioned element | 2 |

Flexible Box Layout

| Property | Description | CSS |
| --- | --- | --- |
| align-content | Specifies the alignment between the lines inside a flexible container when the items do not use all available space. | 3 |
| align-items | Specifies the alignment for items inside a flexible container. | 3 |

-continued

Flexible Box Layout

| Property | Description | CSS |
| --- | --- | --- |
| align-self | Specifies the alignment for selected items inside a flexible container. | 3 |
| display | Specifies how a certain HTML element should be displayed | 1 |
| flex | Specifies the length of the item, relative to the rest | 3 |
| flex-basis | Specifies the initial length of a flexible item | 3 |
| flex-direction | Specifies the direction of the flexible items | 3 |
| flex-flow | A shorthand property for the flex-direction and the flex-wrap properties | 3 |
| flex-grow | Specifies how much the item will grow relative to the rest | 3 |
| flex-shrink | Specifies how the item will shrink relative to the rest | 3 |
| flex-wrap | Specifies whether the flexible items should wrap or not | 3 |
| justify-content | Specifies the alignment between the items inside a flexible container when the items do not use all available space. | 3 |
| margin | Sets all the margin properties in one declaration | 1 |
| margin-bottom | Sets the bottom margin of an element | 1 |
| margin-left | Sets the left margin of an element | 1 |
| margin-right | Sets the right margin of an element | 1 |
| margin-top | Sets the top margin of an element | 1 |
| max-height | Sets the maximum height of an element | 2 |
| max-width | Sets the maximum width of an element | 2 |
| min-height | Sets the minimum height of an element | 2 |
| min-width | Sets the minimum width of an element | 2 |
| order | Sets the order of the flexible item, relative to the rest | 3 |

Text Properties

| Property | Description | CSS |
| --- | --- | --- |
| hanging-punctuation | Specifies whether a punctuation character may be placed outside the line box | 3 |
| hyphens | Sets how to split words to improve the layout of paragraphs | 3 |
| letter-spacing | Increases or decreases the space between characters in a text | 1 |
| line-break |  | 3 |
| line-height | Sets the line height | 1 |
| overflow-wrap |  | 3 |
| tab-size | Specifies the length of the tab-character | 3 |
| text-align | Specifies the horizontal alignment of text | 1 |
| text-align-last | Describes how the last line of a block or a line right before a forced line break is aligned when text-align is "justify" | 3 |
| text-indent | Specifies the indentation of the first line in a text-block | 1 |
| text-justify | Specifies the justification method used when text-align is "justify" | 3 |
| text-transform | Controls the capitalization of text | 1 |
| white-space | Specifies how white-space inside an element is handled | 1 |
| word-break | Specifies line breaking rules for non-CJK scripts | 3 |
| word-spacing | Increases or decreases the space between words in a text | 1 |
| word-wrap | Allows long, unbreakable words to be broken and wrap to the next line | 3 |

Text Decoration Properties

| Property | Description | CSS |
| --- | --- | --- |
| text-decoration | Specifies the decoration added to text | 1 |
| text-decoration-color | Specifies the color of the text-decoration | 3 |
| text-decoration-line | Specifies the type of line in a text-decoration | 3 |
| text-decoration-style | Specifies the style of the line in a text decoration | 3 |
| text-shadow | Adds shadow to text | 3 |
| text-underline-position |  | 3 |

Font Properties

| Property | Description | CSS |
| --- | --- | --- |
| font | Sets all the font properties in one declaration | 1 |
| font-family | Specifies the font family for text | 1 |
| font-feature-setting |  | 3 |
| @font-feature-values |  | 3 |
| font-kerning |  | 3 |
| font-language-override |  | 3 |
| font-synthesis |  | 3 |
| font-variant-alternates |  | 3 |
| font-variant-caps |  | 3 |
| font-variant-east-asian |  | 3 |
| font-variant-ligatures |  | 3 |
| font-variant-numeric |  | 3 |
| font-variant-position |  | 3 |
| font-size | Specifies the font size of text | 1 |
| font-style | Specifies the font style for text | 1 |
| font-variant | Specifies whether or not a text should be displayed in a small-caps font | 1 |
| font-weight | Specifies the weight of a font | 1 |
| @font-face | A rule that allows websites to download and use fonts other than the "web-safe" fonts | 3 |
| font-size-adjust | Preserves the readability of text when font fallback occurs | 3 |
| font-stretch | Selects a normal, condensed, or expanded face from a font family | 3 |

Writing Modes Properties

| Property | Description | CSS |
| --- | --- | --- |
| direction | Specifies the text direction/writing direction | 2 |
| text-orientation |  | 3 |
| text-combine-horizontal |  | 3 |

Writing Modes Properties

| Property | Description | CSS |
| --- | --- | --- |
| unicode-bidi | Used together with the direction property to set or return whether the text should be overridden to support multiple languages in the same document | 2 |
| writing-mode | | 3 |

Table Properties

| Property | Description | CSS |
| --- | --- | --- |
| border-collapse | Specifies whether or not table borders should be collapsed | 2 |
| border-spacing | Specifies the distance between the borders of adjacent cells | 2 |
| caption-side | Specifies the placement of a table caption | 2 |
| empty-cells | Specifies whether or not to display borders and background on empty cells in a table | 2 |
| table-layout | Sets the layout algorithm to be used for a table | 2 |

Lists and Counters Properties

| Property | Description | CSS |
| --- | --- | --- |
| counter-increment | Increments one or more counters | 2 |
| counter-reset | Creates or resets one or more counters | 2 |

Lists and Counters Properties

| Property | Description | CSS |
| --- | --- | --- |
| list-style | Sets all the properties for a list in one declaration | 1 |
| list-style-image | Specifies an image as the list-item marker | 1 |
| list-style-position | Specifies if the list-item markers should appear inside or outside the content flow | 1 |
| list-style-type | Specifies the type of list-item marker | 1 |

Animation Properties

| Property | Description | CSS |
| --- | --- | --- |
| @keyframes | Specifies the animation | 3 |
| animation | A shorthand property for all the animation properties below, except the animation-play-state property | 3 |
| animation-delay | Specifies when the animation will start | 3 |
| animation-direction | Specifies whether or not the animation should play in reverse on alternate cycles | 3 |
| animation-duration | Specifies how many seconds or milliseconds an animation takes to complete one cycle | 3 |
| animation-fill-mode | Specifies what values are applied by the animation outside the time it is executing | 3 |
| animation-iteration-count | Specifies the number of times an animation should be played | 3 |
| animation-name | Specifies a name for the @keyframes animation | 3 |
| animation-timing-function | Specifies the speed curve of the animation | 3 |
| animation-play-state | Specifies whether the animation is running or paused | 3 |

Transform Properties

| Property | Description | CSS |
| --- | --- | --- |
| backface-visibility | Defines whether or not an element should be visible when not facing the screen | 3 |
| perspective | Specifies the perspective on how 3D elements are viewed | 3 |
| perspective-origin | Specifies the bottom position of 3D elements | 3 |
| transform | Applies a 2D or 3D transformation to an element | 3 |
| transform-origin | Allows you to change the position on transformed elements | 3 |
| transform-style | Specifies how nested elements are rendered in 3D space | 3 |

Transitions Properties

| Property | Description | CSS |
| --- | --- | --- |
| transition | A shorthand property for setting the four transition properties | 3 |

-continued

Transitions Properties

| Property | Description | CSS |
|---|---|---|
| transition-property | Specifies the name of the CSS property the transition effect is for | 3 |
| transition-duration | Specifies how many seconds or milliseconds a transition effect takes to complete | 3 |
| transition-timing-function | Specifies the speed curve of the transition effect | 3 |
| transition-delay | Specifies when the transition effect will start | 3 |

Basic User Interface Properties

| Property | Description | CSS |
|---|---|---|
| box-sizing | Tells the browser what the sizing properties (width and height) should include | 3 |
| content | Used with the:before and:after pseudo-elements, to insert generated content | 2 |
| cursor | Specifies the type of cursor to be displayed | 2 |
| icon | Provides the author the ability to style an element with an iconic equivalent | 3 |
| ime-mode | | 3 |
| nav-down | Specifies where to navigate when using the arrow-down navigation key | 3 |
| nav-index | Specifies the tabbing order for an element | 3 |
| nav-left | Specifies where to navigate when using the arrow-left navigation key | 3 |
| nav-right | Specifies where to navigate when using the arrow-right navigation key | 3 |
| nav-up | Specifies where to navigate when using the arrow-up navigation key | 3 |
| outline | Sets all the outline properties in one declaration | 2 |
| outline-color | Sets the color of an outline | 2 |
| outline-offset | Offsets an outline, and draws it beyond the border edge | 3 |
| outline-style | Sets the style of an outline | 2 |
| outline-width | Sets the width of an outline | 2 |
| resize | Specifies whether or not an element is resizable by the user | 3 |
| text-overflow | Specifies what should happen when text overflows the containing element | 3 |

Multi-column Layout Properties

| Property | Description | CSS |
|---|---|---|
| break-after | | 3 |
| break-before | | 3 |
| break-inside | | 3 |
| column-count | Specifies the number of columns an element should be divided into | 3 |
| column-fill | Specifies how to fill columns | 3 |
| column-gap | Specifies the gap between the columns | 3 |
| column-rule | A shorthand property for setting all the column-rule-* properties | 3 |
| column-rule-color | Specifies the color of the rule between columns | 3 |
| column-rule-style | Specifies the style of the rule between columns | 3 |
| column-rule-width | Specifies the width of the rule between columns | 3 |
| column-span | Specifies how many columns an element should span across | 3 |
| column-width | Specifies the width of the columns | 3 |
| columns | A shorthand property for setting column-width and column-count | 3 |
| widows | Sets the minimum number of lines that must be left at the top of a page when a page break occurs inside an element | 2 |

Paged Media

| Property | Description | CSS |
|---|---|---|
| orphans | Sets the minimum number of lines that must be left at the bottom of a page when a page break occurs inside an element | 2 |
| page-break-after | Sets the page-breaking behavior after an element | 2 |
| page-break-before | Sets the page-breaking behavior before an element | 2 |
| page-break-inside | Sets the page-breaking behavior inside an element | 2 |

| Generated Content for Paged Media | | |
|---|---|---|
| Property | Description | CSS |
| marks | Adds crop and/or cross marks to the document | 3 |
| quotes | Sets the type of quotation marks for embedded quotations | 2 |

| Filter Effects Properties | | |
|---|---|---|
| Property | Description | CSS |
| filter | | 3 |

| Image Values and Replaced Content | | |
|---|---|---|
| Property | Description | CSS |
| image-orientation | Specifies a rotation in the right or clockwise direction that a user agent applies to an image | 3 |
| image-rendering | | 3 |
| image-resolution | | 3 |
| object-fit | | 3 |
| object-position | | 3 |

| Masking Properties | | |
|---|---|---|
| Property | Description | CSS |
| mask | | 3 |
| mask-type | | 3 |

| Speech Properties | | |
|---|---|---|
| Property | Description | CSS |
| mark | A shorthand property for setting the mark-before and mark-after properties | 3 |
| mark-after | Allows named markers to be attached to the audio stream | 3 |
| mark-before | Allows named markers to be attached to the audio stream | 3 |
| phonemes | Specifies a phonetic pronunciation for the text contained by the corresponding element | 3 |
| rest | A shorthand property for setting the rest-before and rest-after properties | 3 |
| rest-after | Specifies a rest or prosodic boundary to be observed after speaking an element's content | 3 |
| rest-before | Specifies a rest or prosodic boundary to be observed before speaking an element's content | 3 |
| voice-balance | Specifies the balance between left and right channels | 3 |
| voice-duration | Specifies how long it should take to render the selected element's content | 3 |
| voice-pitch | Specifies the average pitch (a frequency) of the speaking voice | 3 |
| voice-pitch-range | Specifies variation in average pitch | 3 |
| voice-rate | Controls the speaking rate | 3 |
| voice-stress | Indicates the strength of emphasis to be applied | 3 |
| voice-volume | Refers to the amplitude of the waveform output by the speech synthesis | 3 |

| Marquee Properties | | |
|---|---|---|
| Property | Description | CSS |
| marquee-direction | Sets the direction of the moving content | 3 |
| marquee-play-count | Sets how many times the content move | 3 |
| marquee-speed | Sets how fast the content scrolls | 3 |
| marquee-style | Sets the style of the moving content | |

By way of even more specific example, the following XML markup example can be used in the library for setting a background color of a launching page of a mobile application for any number of different platforms. Accordingly, as with any of the examples provided herein, this pre-coded snippet can be natively rendered on any platform, and by implementing the aspects of the present invention, can be customized to fit any platform specific format. This XML markup example can also be formatted virtually on the designer's tool, and any design layout can automatically be formatted for any particular platform.

```
<!DOCTYPE html>
<html>
<head>
<style>
body {
   background-color: #b0c4de;
}
</style>
</head>
<body>
<h1>KONY APPLICATIONS!</h1>
<p>Hello world! This is KONY.com.</p>
</body>
</html>
```

Cloud Computing Environment

Figure 2:
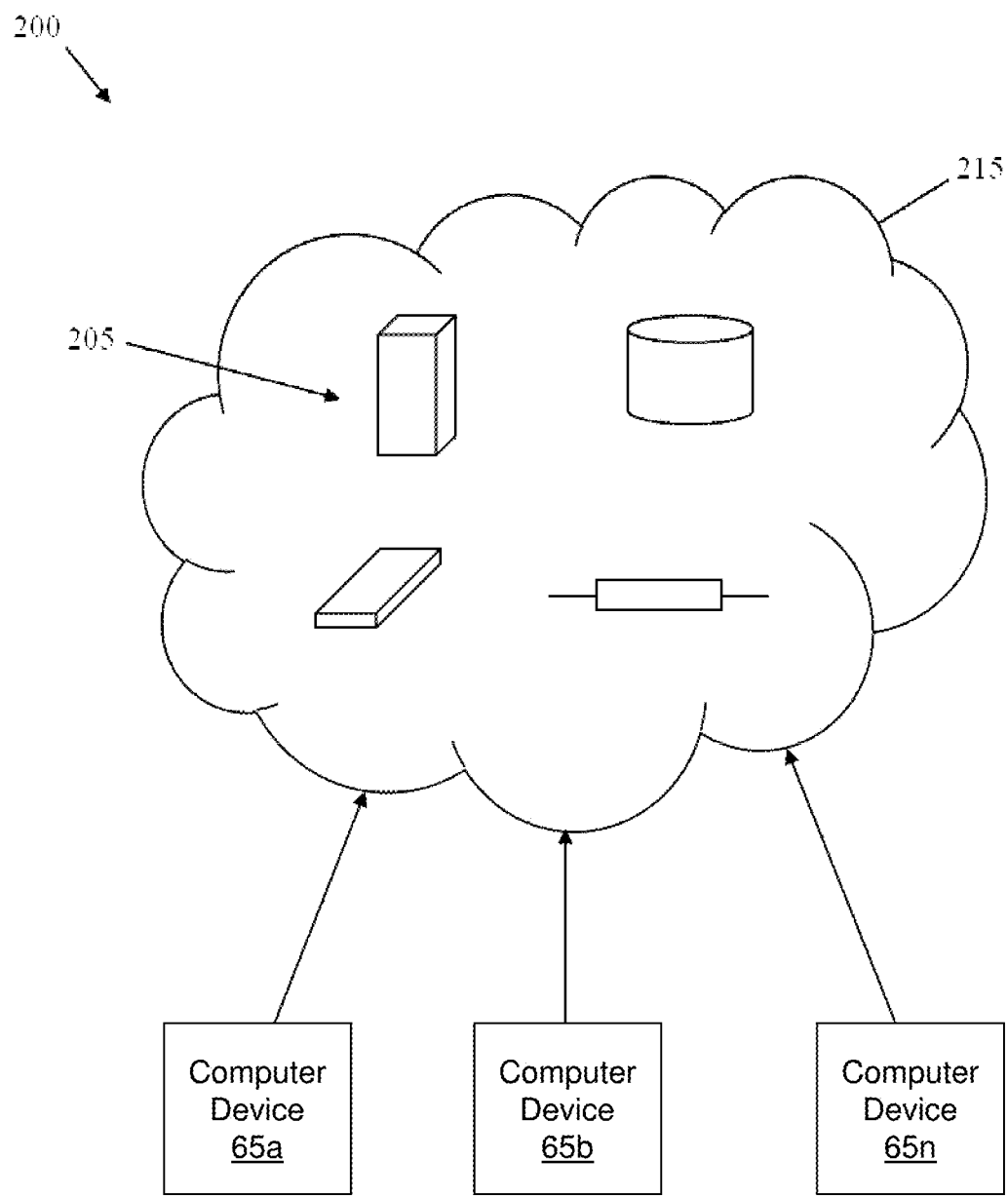
FIG. 2 shows an exemplary cloud computing environment in accordance with aspects of the invention.

FIG. 2 shows an exemplary cloud computing environment 200. Cloud computing is a computing model that enables convenient, on-demand network access to a shared pool of configurable computing resources, e.g., networks, servers, processing, storage, applications, and services, that can be provisioned and released rapidly, dynamically, and with minimal management efforts and/or interaction with a service provider. In embodiments, one or more aspects, functions and/or processes described herein may be performed and/or provided via cloud computing environment 200.

As depicted in FIG. 2, cloud computing environment 200 includes cloud resources 205 that are made available to client devices 65a . . . n via a network 215, such as the Internet. In embodiments, the client devices 65a . . . n can launch and natively render any design layout, as provided by the designer, regardless of platform. By way of example, the client devices 65a . . . n can be provided with a link to a design layout of an application from the cloud resources 205, e.g., server 12 of FIG. 1, launch the design layout and its underlying functionality, and then render natively the application with its design layout and its underlying functionality on the client devices 65a . . . n. The design layout and its underlying functionality will be formatted for the particular platform of the client devices 65a . . . n, allowing the user to: (i) click through the design layout which is compiled in real time, (ii) debug the design layout, (iii) ensure consistency of the design layout through different platforms, (iv) ensure that the design layout meets the user's business requirements, as well as (v) allow the user to provide comments to the designer and/or developer (which are directly tagged to any of the pertinent native design elements) for the review.

Cloud resources 205 can include a variety of hardware and/or software computing resources, such as servers, databases, storage, networks, applications, and platforms as shown, for example, in FIG. 1. Cloud resources 205 may be on a single network or a distributed network across multiple cloud computing systems and/or individual network enabled computing devices. Client devices 65a . . . n may comprise any suitable type of network-enabled computing device, such as handheld computers (e.g., smartphones, tablet computers or other platforms). Cloud resources 205 are typically provided and maintained by a service provider so that a client does not need to maintain resources on a local client device 65a . . . n. In embodiments, cloud resources 205 may includes one or more computing system 14 and/or server 12 of FIG. 1 that is specifically adapted to perform one or more of the functions and/or processes described herein.

Cloud computing environment 200 may be configured such that cloud resources 205 provide computing resources to client devices 65a . . . n through a variety of service models, such as Software as a Service (SaaS), Platforms as a service (PaaS), Infrastructure as a Service (IaaS), and/or any other cloud service models. Cloud resources 205 may be configured, in some cases, to provide multiple service models to a client device 65a . . . n. For example, cloud resources 205 can provide both SaaS and IaaS to a client device 65a . . . n. Cloud computing environment 200 may be configured such that cloud resources 205 provide computing resources to client devices 65a . . . n through a variety of deployment models, such as any combination of public, private, community, hybrid, and/or any other cloud deployment model.

One or more cloud resources 205 may be structured in multiple layers or functional abstraction layers, e.g., a firmware and hardware layer, a kernel layer, an infrastructure service layer, a platform service layer, and an application service layer. The firmware and hardware layer may be the lowest layer upon which the other layers are built, and may include generic contributing nodes (e.g., data centers, computers, and storage devices) geographically distributed across the Internet and provide the physical resources for implementing the upper layers of the cloud service provider. The kernel layer is above the firmware and hardware layer and may include an operating system and/or virtual machine manager that host the cloud infrastructure services. The kernel layer controls and communicates with the underlying firmware and hardware layer through one or more hardware/firmware-level application programming interfaces (APIs). The infrastructure service layer is above the kernel layer and may include virtualized resources, such as virtual machines, virtual storage (e.g., virtual disks), virtual network appliances (e.g., firewalls), and so on. The infrastructure service layer may also include virtualized services, such as database services, networking services, file system services, web hosting services, load balancing services, message queue services, map services, e-mail services, and so on. The platform service layer is above the infrastructure service layer and may include platforms and application frameworks that provide platform services, such as an environment for running virtual machines or a framework for developing and launching a particular type of software application. The application service layer is above the platform service layer and may include a software application installed on one or more virtual machines or deployed in an application framework in the platform service layer. The software application can also communicate with one or more infrastructure service components (e.g., firewalls, databases, web servers, etc.) in the infrastructure service layer.

Displays and Related Functionality

As described thus far, the cross platform application prototyping tool 50 allows the design to create and modify native design elements (design layouts) and associated properties as noted above for different platforms. As should further be understood, using the library of native design elements the designer can drag and drop a native design element into a virtual interface of any number of predefined platforms, switching between the different platforms for customization and further modification, if desired. This, in turn, allows the designer the ability to design and view a single design layout across many platforms, while providing the ability to uniquely customize, e.g., change values and native design elements, to different platforms at any point in the design process.

In further embodiments, as further described herein, the cross platform application prototyping tool 50 allows the user to define a set of collections, e.g., a library of differently combined native design elements, for later use in any design process. These collection of assets, e.g., collection of native design elements, can be placed (dragged and dropped) directly into an interface provided on the display of the designer's computing device in order to visualize, in a relative layout, the design layout of the native design elements on any platform. As in the native design elements, itself, the collection of native design elements and their related functionality can be provided in JS or XML, as examples. In this way, the designer does not have to write code or understand any platform.

In addition, the collection of native design elements, as already described herein, can be automatically reformatted for any interface of any platform, using the single tool. This provides the designer with the ability to view the native design elements or collection of native design elements in a native interface, thereby ensuring design consistency and formatting. That is, the cross platform application prototyping tool 50 creates a functional preview of the natively rendered application, allowing the user to click through the application, which can be compiled in real time.

FIGS. 3-10 show various displays of the cross platform application prototyping tool 50 and its underlying functionality in accordance with the present invention. The various displays are provided on a computing device such as the computing device 14 shown in FIG. 1. Accordingly, the underlying functionality of the various displays can be implemented using the infrastructure 10 shown in FIG. 1.

Figure 3:
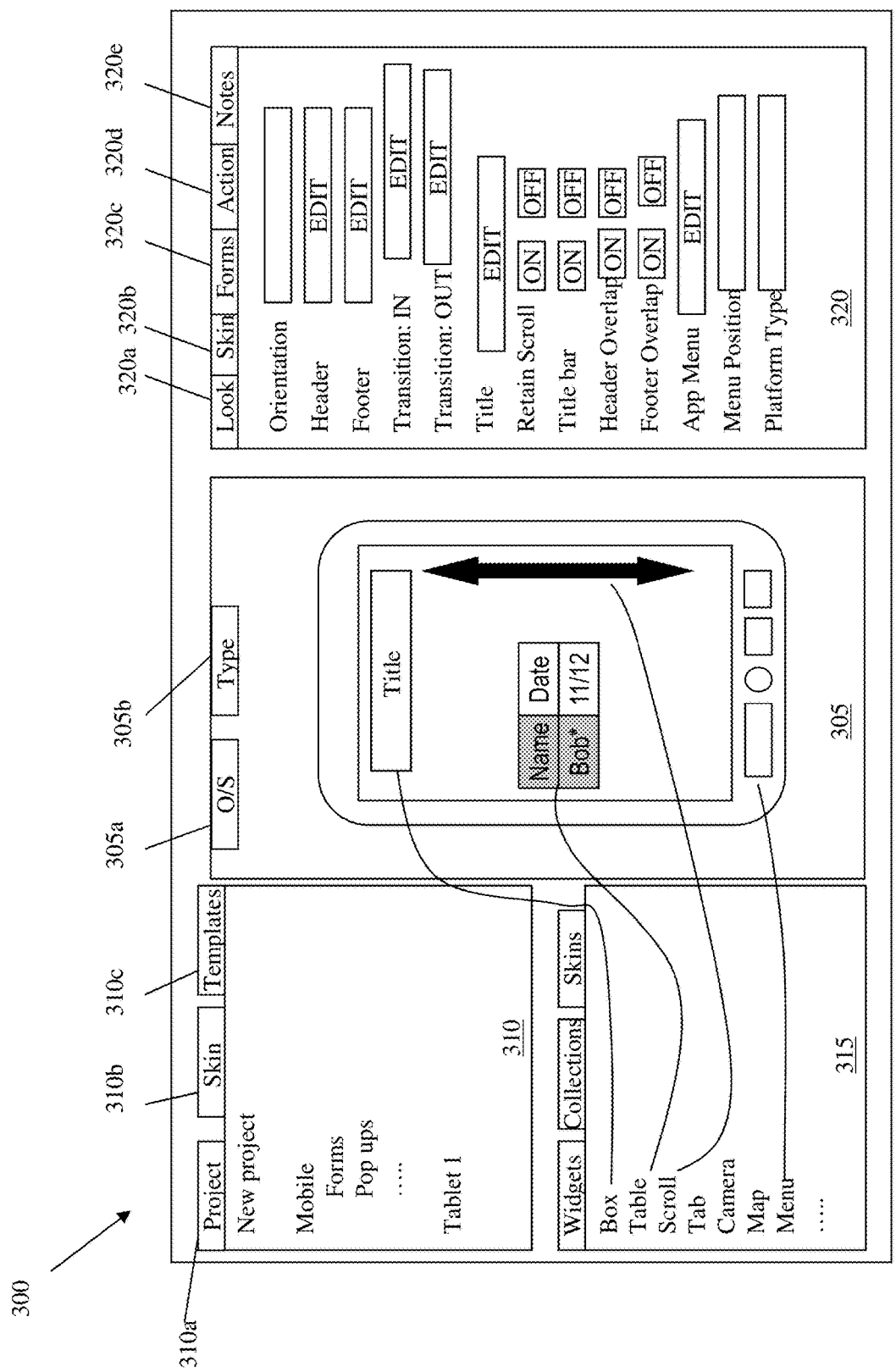

FIG. 3 shows an overview of an exemplary display, implementing the different aspects of the present invention. In particular, the display 300 includes different sections which implement different functionalities of the present invention, e.g., automatically formatting and customizing design layouts for different platforms, which can be natively rendered. These sections include, e.g., a virtual screen (e.g., canvas) 305 representative of an interface for a predefined platform, a field services section 310, a library section 315 of different native design elements and collections and properties section 320.

In embodiments, the virtual screen 305 is representative of a display as would be natively rendered for different operating systems and different devices, e.g., platforms. For example, the virtual screen 305 can be representative of an Apple® iOS operating system using an Apple® iPhone® 4, with a screen resolution of 840×940. In other examples, the virtual screen 305 can be representative of any number of different combinations of operating systems and devices (also referred herein as platforms), e.g., Android® operating systems using a Samsung Galaxy® device with a certain resolution.

As shown in FIG. 3, virtual screen 305 can be changed by selecting fields 305*a* and 305*b* which provide the designer with the ability to change platforms, e.g., visualize the design layouts of native design elements in different platforms in real time without the need to recompile design code, e.g., change the virtual screen 305. That is, the designer now has the ability, amongst other capabilities, to define workflows of a prototype application in different platforms without writing any code using a workflow editor. This is accomplished using, e.g., XML code, as described herein.

More specifically, the fields 305*a* and 305*b* can be scrollable fields, providing an operating type 305*a*, e.g., iOS: native, and a device type with certain resolution 305*b*, e.g., Apple iPhone® 4 with a certain resolution. In embodiments, the cross platform application prototyping tool can provide a canvas for different platforms including, e.g., desktop web, mobile native, and mobile web, amongst other different platforms.

By selecting and scrolling down on fields 305*a* and 305*b*, it is possible to change the virtual screen 305 to different operating systems and/or devices, with the native design elements being automatically reformatted in a display layout for such platform. For example, virtual screen 305 can be changed from Apple® iOS operating system using an Apple® iPhone® 4 with a screen resolution of 840×940 to a virtual screen for an Android® operating system using a Samsung® Galaxy® with a screen resolution 1080×1920. Thus, by selecting a different virtual screen in the fields 305*a* and 305*b*, the cross platform application prototyping tool will automatically reformat the application layout relative to the newly selected platform without the need to reformat or rewrite any code.

Figure 4A:
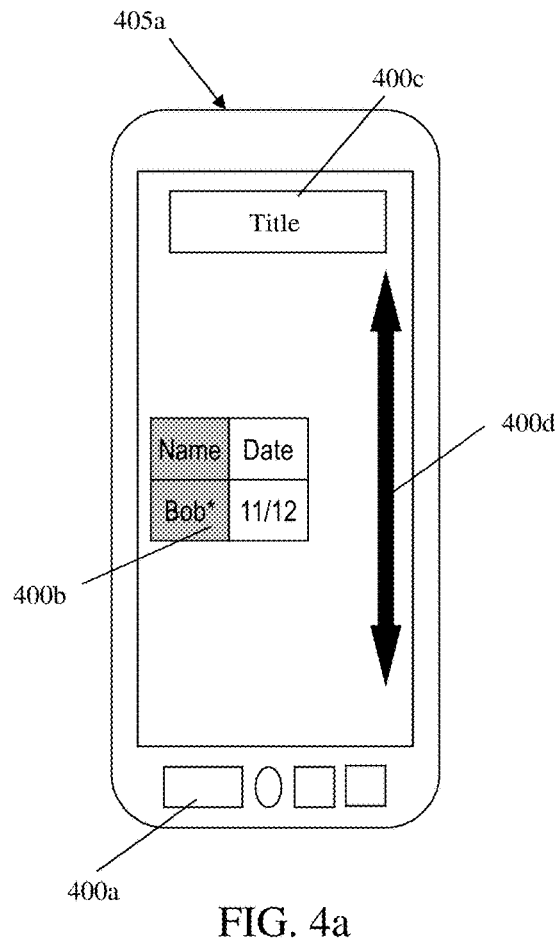
Figure 4B:
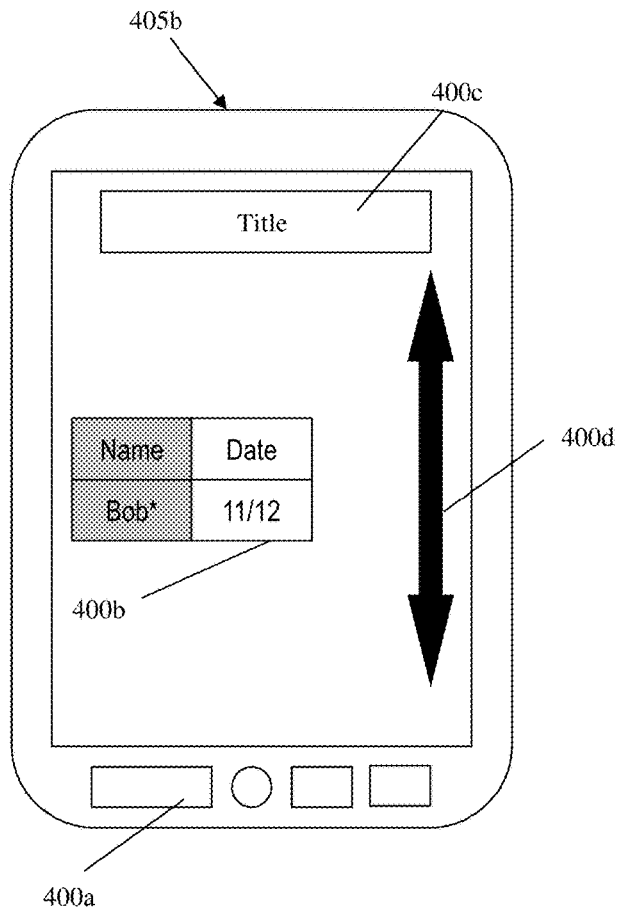

By way of example, FIGS. 4*a* and 4*b* show representations of two different platforms (e.g., devices) 405*a* and 405*b*, respectively. In this example, the design layout with native design elements was originally designed for device 405*a*. Here, the design layout includes native design elements including menu application 400*a*, table 400*b*, title 400*c* and scroll bar 400*d*. These basic widgets can include any user interface styling for margins and padding, borders, shadows, etc., to deliver a rich native user interface application. As shown in this representation, the menu application 400*a*, table 400*b*, title 400*c* and scroll bar 400*d* are positioned at certain locations within the interface for device 405*a*. By selecting a new operating system in field 305*a* and a new device in field 305*b* of FIG. 3, these different native design elements will be automatically reformatted in a relative layout for the interface of device 405*b*, as shown in FIG. 4*b*. In this way, it is possible for the designer to visualize a design in different formats, e.g., for different platforms, without rewriting any code or understanding the platform.

Accordingly, as should now be understood in view of FIGS. 4*a* and 4*b*, the cross platform application prototyping tool 50 is capable of converting a first design layout comprising one or more native design elements which fits within an interface associated with a first platform of the different, predefined platforms (as shown in FIG. 4*a*) to a second design layout comprising the one or more native design elements which fits within an interface associated with a second platform of the different, predefined platforms, and which is in proportion to the first design layout (as shown in FIG. 4*b*). In this way, the design layouts of the first design layout and the second design layout are reproducible functional prototype applications for different platforms, which can be provided as a canvas (e.g., virtual interface 305) on the computing device of the designer. And, the first platform (as shown in FIG. 4*a*) can be representative of at least one of a first operating system and a first device and the second platform (as shown in FIG. 4*b*) can be representative of at least one of a second operating system and a second device, where the design layouts are reformatted to fit within a virtually interface associated with any platform.

Referring back to FIG. 3, field services section 310 provides different functionality, accessible through different tabs, including: a project tab 310*a*, skins tab 310*b*, templates tab 310*c*, etc. In embodiments, the project tab 310*a* allows the designer to define and save projects. For example, the designer can create a new project which can include multiple forms or pages for a mobile device, tablet, etc., as shown in virtual screen 305. The forms or projects can be provided with a name provided by the designer, e.g., frmLogin.

The skins tab 310*b*, templates tab 310*c* and other tabs, e.g., assets tab, permit the designer to design and save different skins, templates and assets for different platforms as selected in fields 305*a* and 305*b*. Also, the cross platform application prototyping tool provides a dynamic link to different applications, e.g., fireworks, illustrator, Photoshop®, etc., which allows the functionality of these different applications to be imported and used in a new design or layered style in the design layout.

The virtual screen 305 can also be populated with different native design elements using the design formats in the list of libraries 315, e.g., widgets, collections, skins, device applications, etc. For example, the designer can select, drag and drop any of the widgets (native design elements) into the virtual screen 305, in a desired design layout. These different design layouts can be layered on one another to provide a design layout of different pages, e.g., click through experience As noted already herein, each of these native design elements will have underlying code, e.g., XML, such that the designer can provide a functional rendering of the application in a desired layout in the virtual screen 305. This functional rendering of the prototype application can also be launched in a mobile device, natively rendering the application on a specific platform as described herein. By way of some examples, these widgets (and underlying functionality and properties) can include fillable fields, boxes, tables, scrolls, device applications such a camera, phone, etc.

As shown in FIG. 3, the table, scroll, menu and box widgets were selected, dragged and dropped into the virtual screen 305 in a desired design layout (which can be layered on one another for a click through experience), for a particular operating system and device. These different native design elements are fully functional such that the designer can click through an application to determine its interactivity amongst different pages, applications and other native design elements, and combinations thereof. For example, by selecting the scroll, it is possible for the designer to scroll down or up through the design layout, as if it was natively rendered on a mobile device with a particular platform. And, importantly, by changing the operating system and/or device type, the designer can also interact with the newly reformatted layout, as it would be in a different device and/or operating system.

As further shown in FIG. 3, the native design elements of the virtual screen 305 can be customized by selecting certain properties such as provided in the properties section 320. In embodiments, the properties can be customized by selecting certain tabs within the properties section 320: look 320a, skin 320b, forms 320c, and action 320d. The properties can include any of the properties described herein. The designer can also provide notes for the different forms and designs, by selecting the notes tab 320e.

In the example of FIG. 3, the forms tab 320 allows the design to customize any portion of the form, e.g., display, including: (i) display orientation, (ii) headers, (iii) footers, (iv) in any of out of transition configuration; as well as turning on and off the following features: (i) scroll position, (ii) header overlap, (iii) footer overlap, (iv) application menu, and (v) menu position. In embodiments, any of these fields can be customized for any operating system and device, e.g., platform, as described herein. For example, by selecting the "on" button for the application menu, the tool of the present invention provides the designer with the ability to select which platforms will implement which functions and properties of any native design element, e.g., application menu, etc. In the example of FIG. 3, a title can also be provided in a fillable field.

Figure 5:
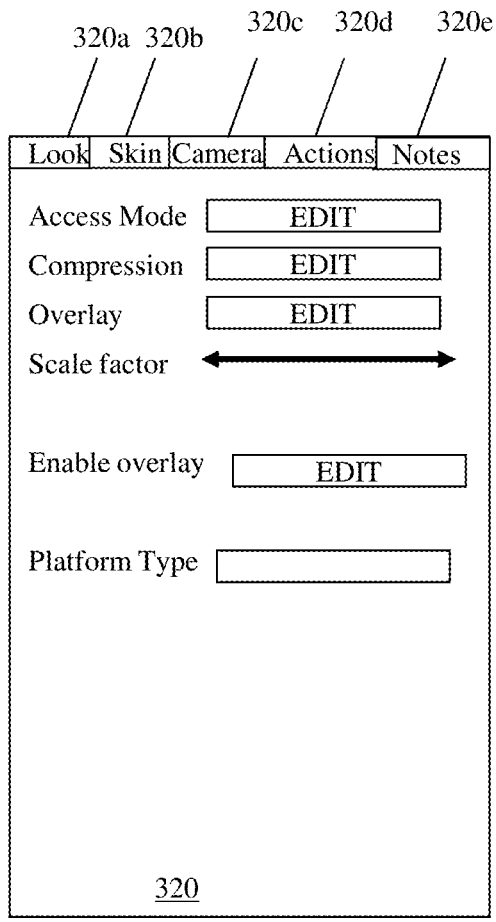

In the example of FIG. 3, the forms tab 320c can be dynamically changed depending on the selected native design element, e.g., widget, or stage of design layout. For example, the forms tab 320c is provided at the initial stage of design, when defining a project; however, this tab can automatically change to customize different native design elements by simply selecting the widget (native design element) on the virtual screen 305. For example, by selecting a camera application, the forms tab will automatically change to a camera tab 320c as shown in FIG. 5. The camera tab 320c will then auto populate with customization tools for a camera. In the example of FIG. 5, the selection of the camera tab 320c will result in properties being presented to the designer for the camera, e.g., access mode, compression, overlay, scale factor and enable overlay for different platforms, e.g., operating systems and device type.

By way of another example, the properties of a box can be selected to change the vertical or horizontal positions, as well as other features and properties (e.g., alignment, fill aspects, etc.). Accordingly, it should be understood by those of skill in the art that the cross platform application prototyping tool will provide different customization tools for different native design elements, e.g., widgets, collection of widgets, applications, etc., depending on the selection of such native design element within the virtual screen 305.

Figure 6:
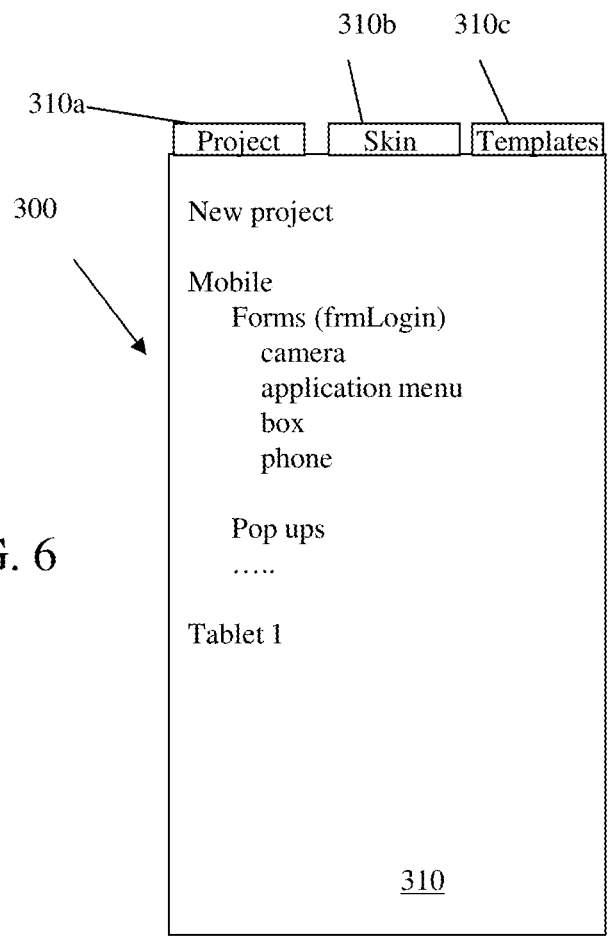

In embodiments, during the design stage, the cross platform application prototyping tool will automatically save the design layout of the virtual screen, e.g., native design elements such as widgets, in the respective form. For example, as shown in FIG. 6, all of the native design elements (e.g., widgets, collections, etc.) of a prototype application will be saved as a form, e.g., frmLogin. So, for example, as the designer is laying out the design, e.g., by dragging and dropping and customization, the form will be automatically populated with the native design elements. In this example, the form, e.g., the virtual screen for a particular design layout, will include camera, application menu, box and phone, as customized by the designer during any stage of design. By selecting the respective form, e.g., frmLogin, the designer can preview the saved design layout for updating, e.g., refine, modify or alter the design or layout of the application. In fact, by simply selecting and dragging the saved design element to another form, for example, it is possible to reuse this same asset in other applications.

Figure 7:
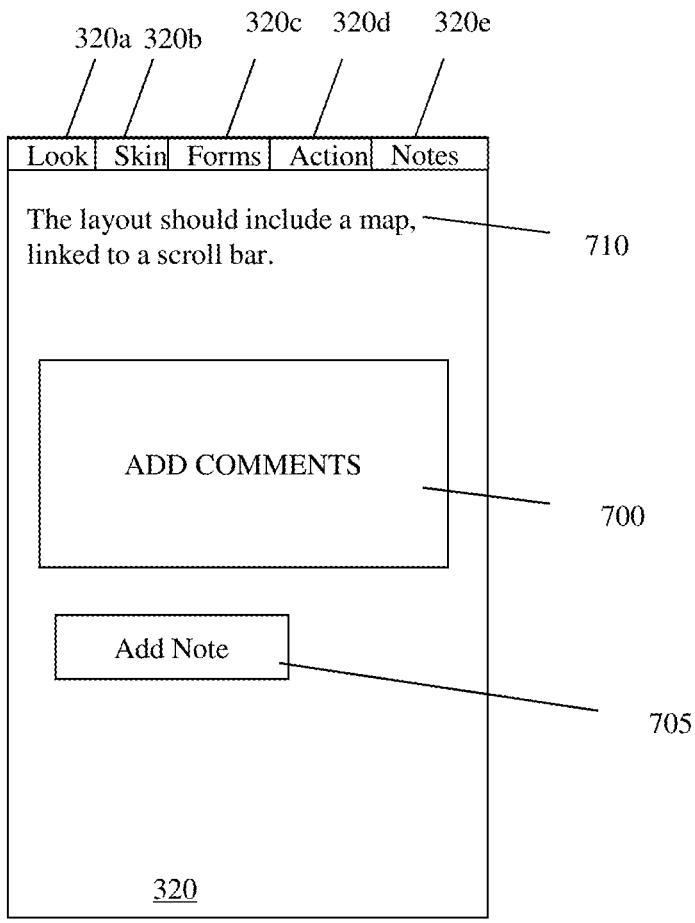
Figure 8:
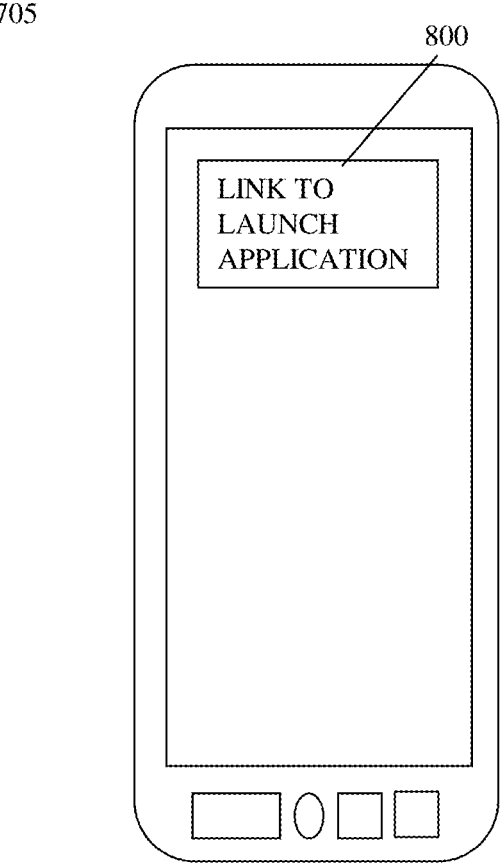

FIG. 7 shows a display using the notes capabilities in accordance with aspects of the present invention. As shown in FIG. 7, by selecting the notes tab 320e, the cross platform application prototyping tool will provide the designer with the capabilities and underlying functionality to provide comments associated with any of the native design elements, e.g., widgets, forms, workflow processes, etc. For example, in FIG. 7, a comment box 700 can be a fillable field for the designer to include a comment. By selecting the "add" button 705, the comment can be saved at reference numeral 710, which is then automatically linked to a native design element, e.g., widget, form, etc. for which it pertains to. The comments can be sorted to platform and channel (e.g., mobile web, native, tablet, etc.), as examples.

As should thus be understood with respect to at least FIG. 7, the different players, e.g., designer, developer and client, can collaboratively design the design layout by tagging comments to any particular design element of the native design elements. These tagged comments are accessible on any native platform and the computing device comprising the library of the native design elements. The tagged comments are transferrable between any native platform and the computing device using a server (e.g., cloud of FIG. 2 and/or the server of FIG. 1) such that comments can be made and tagged to any particular design element of the native design elements on the native platform and the computing device.

This, as a powerful means for collaboration communications, the comments can be shared with the client and developer during different stages of the design process. For example, the client can view the comments when reviewing the newly designed application in a native platform, e.g., operating system and particular type of device. For example, the designer can upload the comments and layouts and underlying functionality to a server, e.g., server 12 of FIG. 1, where it can be launched to the mobile device of the client by using a simple link as shown at reference numeral 800 of FIG. 8. By selecting the link, the design layout with underlying functionality and comments are uploaded (shared) and the design layout is rendered natively on the mobile device, e.g., specific operating system and device, where the client can preview the comments and any layouts, as the layout of the design will be natively rendered on the mobile device.

In embodiments, the client or other user can retrieve the design layout with underlying functionality and any comments by downloading the application from an application store, where the user supplies an ID for the prototype, and the prototype is loaded into the shell application where the user interface can be rendered natively. By having the shell application, the user can make direct comments or notations within the application which is then captured in the prototype. This will allow the client to click through the application and test any of its functionality, designs, etc., to determine whether it has any bugs and/or meets the client's requirements. Also, the prototype native application can be rendered in real time within a respective mobile device.

If the client has any comments, e.g., feedback, the client (or any authorized user) can simply add comments in a comment box provided on the mobile device as shown in FIG. 9 at reference numeral 900. The comment will be linked to the specific native design element, e.g., widget, form, platform, etc. for which it pertains to. After completion of the comments, the client can then upload the comments to the server, e.g., server 12 of FIG. 1, which can then be provided to the designer in the cross platform application prototyping tool, in the notes section shown in FIG. 7, for example. The designer can then select a comment, which will automatically bring the designer to the specific native design element, e.g., widget, form, etc. for which it pertains. In this way, the designer can view comments made by users (clients) testing the prototype application directly within the platform, with the comments being captured within a requirements management tool to track progress against a comment that is declared a requirement. In embodiments, the users (client) can mark a comment as a new requirement, an enhancement or a bug directly within the prototype. Once the comments are incorporated into the design, the design can republish the design.

In embodiments, the client, designer and/or developer can download the design layout through the cloud services shown in FIG. 2. For example, the designer can publish the prototype application (with the design layout and underlying functionality) to the cloud, which can be retrieved by the client and/or developer. Once the client and/or developer has previewed the prototype application, they can then upload the previewed application and any comments back to the cloud, where it is retrievable by the designer. Importantly, the designer can make any revisions/modifications to the prototype application based on comments from the developer and/or the client, without the need to recode any of the design layout. Instead, by simply returning to the library of native design elements, the designer can update functionality by a simple selection, drag and drop operation, and/or manipulate the native design elements within the current design layout by simply rearranging assets. The simple drag and drop operations will automatically include the underlying functionality, and since the underlying code is provided in an XML or JS based language, all of the functionality of the new design will automatically be functional in any selected platform. Thus, the cross platform application prototyping tool 50 can be used as a drop and drag tool to create, modify and develop any number of different applications, with the same sizes, formats and properties across applications associated with different platforms.

Referring to back to FIG. 3, by selecting the look tab 320a, the designer is provided with the additional capabilities of adjusting margins, alignment and other features of any selected native design element. For example, as shown in FIG. 10, the designer is provided with the capabilities to align a widget to the left, center or right, as well as adjust margins, dimensions, or other scaling properties, etc. for individual native design elements for different platforms. By way of example, a logo or fillable field can be scaled or aligned to one other or combinations thereof within the canvas (virtual screen).

The margins, alignments and the like can be adjusted by a scroll or selection of an arrow, etc., by way of some different examples. For example, any of the design layout features of FIG. 4a or 4b can be individually selected and then their positions, etc. can be adjusted through the selection of the look tab 320 and its related adjustments. It should be understood that different "looks" can be provided for different platforms by simply selecting an individual adjustment, and such design layout can be individually saved for different platforms, etc. Again, the designer is provided with the advantage of being able to design a design layout with the underlying functionality, preview the layout and its functionality and make any adjustments without the need to recode the application. This same advantage is afforded to the client, by being able to natively render the design layout of the application on their mobile device or other platform.

The cross platform application prototyping tool also provides the ability to create containers (with the underlying functionality as already described herein) such as boxes for other native design elements. For example, because devices and screens sizes change, the cross platform application prototyping tool is dynamic enough to adapt to the majority of cases. This is done by using containers called an HBox and a VBox that help align native design elements horizontally and vertically. For example, by placing an HBox on the form, any native design element (widget) dropped into it will be stacked horizontally; left to right by default. VBox, on the other hand, stacks native design elements (widgets) vertically from top to bottom. In embodiments, the boxes can be stacked, as well as the native design elements within the boxes can be stacked. The margins of these containers can be adjusted top, bottom, left and right. Also, similar to other native design elements, other properties of these containers can be adjusted such as, for example, opacity, borders, background, shadowing, etc. The containers can also be named with an ID.

Related Architectures

Figure 11:
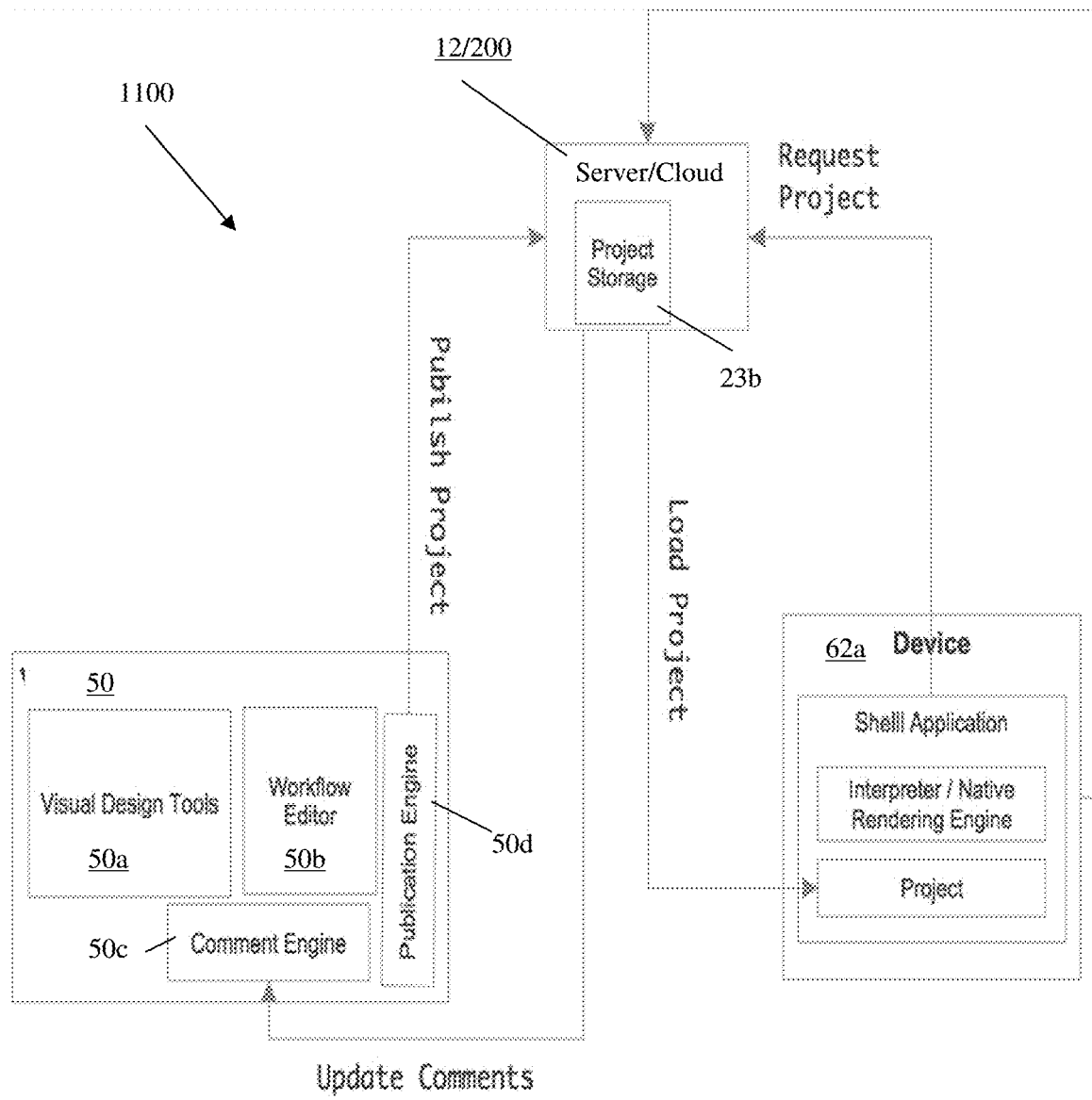
FIG. 11 shows an exemplary architecture in accordance with the present invention.

FIG. 11 shows an exemplary architecture in accordance with the present invention. The architecture 1100 of FIG. 11 can also be representative of a process flow or high-level block diagram in accordance with aspects of the present invention. The steps of the process flow may be implemented and executed, for example, from either a server, in a client-server relationship, or they may run on a user workstation with operative information conveyed to the user workstation as described herein and as represented in at least FIGS. 1 and 2. Furthermore, steps of the processes of the invention may be implemented using a computer-readable storage medium having program code for use by or in connection with a computer or any instruction execution system as described herein.

More specifically, the architecture 1100 of FIG. 11 shows a cross platform application prototyping tool 50. In embodiments, the cross platform application prototyping tool 50 includes a design layout tool 50a, a workflow editor 50b, a comment engine 50c and a publication engine 50d. The design layout tool 50a includes the functionality as described with respect to FIGS. 1-10. For example, the design layout tool 50a provides the designer with the capabilities to design, modify, and/or update design layouts for prototype applications using a library of native design elements, which can be visually rendered with its related functionality in a relative layout on a canvas, e.g., virtual screen, of different platforms, without the need to rewrite code for the different platforms. By implementing the design layout tool 50a, the user is provided with the capabilities to click through, test and debug prototype applications at any stage of the design process, as automatically reformatted in any selected platform.

The workflow editor 50b which creates actions. For example, by selecting the actions tab 320d shown in FIG. 3, the cross platform application prototyping tool can navigate between different pages of the prototype application.

The comment engine 50c allows the designer to enter comments, and associate the comments with a specific native design element for which it pertains. In embodiments, the association can be provided by tags or links within a database. By selecting the comments, the native design element can be automatically shown on the virtual screen. In further embodiments, the comment engine 50c can provide (publish) the comments to a database or other storage (e.g., storage 23b of FIG. 1) within a server or cloud (e.g., reference numeral 12/200), such as discussed with reference to FIGS. 1 and/or 2. These comments (in addition to the design layout of a prototype application) can then be provided to a client, e.g., requested and then loaded on device 62a-n, as they are associated with a native design element of the design layout of a prototype application.

By providing the comments with the design layout, the client can review the comments in the context of the pertinent aspects of the design layout, published to the server or cloud 1110 by the publication engine 50d. The client, in turn, can then make additional comments which will be associated with a particular native design element of the design layout, and upload these comments to the server or cloud. The designer can then be provided with these updated comments, via the comment engine 50c. More specifically, the designer can synchronize their workbench which will receive the comments about the prototype application directly in their design tool 50a.

In further embodiments, the client can preview the design layout of the prototype application by, for example, requesting a project. The request can be provided by a link provided to the client. Once the client requests a project, e.g., design layout of a prototype application, the client can then provide a unique ID, in order for the prototype application to be loaded on the device. In embodiments, the prototype application will be loaded within a shell that includes an interpreter/native rendering application. In this way, the prototype application can be rendered natively in on any platform.

In embodiments, a service provider, such as a Solution Integrator, could offer to perform the processes described herein. In this case, the service provider can create, maintain, deploy, support, etc., the computer infrastructure that performs the process steps of the invention for one or more customers. These customers may be, for example, any business that uses technology. In return, the service provider can receive payment from the customer(s) under a subscription and/or fee agreement and/or the service provider can receive payment from the sale of advertising content to one or more third parties.

The foregoing examples have been provided for the purpose of explanation and should not be construed as limiting the present invention. While the present invention has been described with reference to an exemplary embodiment, Changes may be made, within the purview of the appended claims, without departing from the scope and spirit of the present invention in its aspects. Also, although the present invention has been described herein with reference to particular materials and embodiments, the present invention is not intended to be limited to the particulars disclosed herein; rather, the present invention extends to all functionally equivalent structures, methods and uses, such as are within the scope of the appended claims.

What is claimed is:

1. A method of prototyping an application with a computing device, comprising:
providing a library of pre-defined native design elements in a library section of a display which are reproducible in different design layouts on an interface associated with different, predefined platforms; and
providing selecting fields in a virtual screen section of the display, wherein the selecting fields are configured to enable a user to convert, in real time without recompiling any design code, a first design layout comprising one or more native design elements which fits within an interface associated with a first platform of the different, predefined platforms to a second design layout comprising the one or more native design elements which fits within an interface associated with a second platform of the different, predefined platforms, the second platform having a different operating system than an operating system of the first platform, and which is in proportion to the first design layout by using the pre-defined native design elements for the second platform in the library,
wherein the converting comprises automatically reformatting the one or more design elements to fit within a virtual interface associated with the second platform without the need to reformat or rewrite any code,
wherein the library of pre-defined native design elements is pre-coded with an XML based language configured to separate document content from document presentation of a document;
wherein the selecting fields include a first scrollable selecting field and a second scrollable selecting field, each of which are in the virtual screen section of the display, the first scrollable selecting field being configured to select among different operating systems, and the second scrollable selecting field being configured to select among different device types having different resolutions from one another; and
wherein the library section and the virtual screen section are configured to permit a user to select, drag and drop the pre-defined native design elements from the library section to the virtual screen section based on selections made by the user in the first scrollable selecting field and the second scrollable selecting field in the virtual screen section.

2. The method of claim 1, wherein the interface associated with the different, predefined platforms is a canvas representing a virtual interface, and wherein the converting between the first and second platform is performed using XML code.

3. The method of claim 1, wherein the first platform and the second platform are different computing devices, and wherein the XML based language is a style sheet language configured for describing a look and formatting of the document written in a markup language by defining a set of rules for encoding the document by generating code for different properties, including at least one of weight, opacity, format, font, color and size, and for layouts of the document.

4. The method of claim 1, wherein the first design layout and the second design layout are fully functional prototype applications for different platforms, and wherein the XML based language is cascading style sheet (CSS) code configured to allow the user to control selection of color properties, background and border properties, box properties, text properties, font properties, table properties, animation properties, writing mode properties, transitions properties, user interface properties and speech properties.

5. The method of claim 4, wherein the first platform is representative of at least one of a first operating system and a first device and the second platform is representative of at least one of a second operating system and a second device.

6. The method of claim 1, wherein the providing of the library of native design elements includes providing underlying functionality and respective code of the native design elements such that a functional prototype application is created in a virtual interface associated with any of the different, predefined platforms.

7. The method of claim 1, further comprising collaboratively designing a design layout by tagging comments to any particular design element of the native design elements.

8. The method of claim 7, wherein the tagged comments are accessible on any native platform and the computing device comprising the library of the native design elements.

9. The method of claim 7, wherein the tagged comments are transferrable in real time between any native platform and the computing device using a server such that comments can be made and tagged to the any particular design element of the native design elements on the native platform and the computing device, and wherein changes can be made to the second design layout based on the tagged comments without the need to recode the native design elements.

10. The method of claim 9, wherein the tagged comments are made by a first user, and, when a designer or a second user selects the tagged comments made by the first user regarding the particular design element after the comments are transferred, the designer or second user will automatically be brought to the particular design element which the tagged comments pertain to.

11. The method of claim 1, further comprising changing properties of the native design elements, separately, for any combination of the different, predefined platforms.

12. The method of claim 1, wherein the first design layout with its corresponding one or more native design elements and the second design layout with the corresponding one or more native design elements are natively rendered on a device respectively associated with the first platform and the second platform, and further comprising a field services section configured to provide different functionality, accessible through different tabs, including a project tab configured to allow a designer to define and save projects and to create a new project which includes multiple forms or pages for a mobile device.

13. The method of claim 1, further comprising:
providing a user with a tool enabling the user to select which of the predefined platforms will implement functions and properties of the one or more native design elements.

14. A method comprising:
representing a design layout with native design elements on a virtual screen provided on a first computing device regardless of platform and which can be natively rendered on a second computing device, wherein the representing comprises providing a library of predefined coded native design elements in a library section of a display which can be selected, dragged and dropped into the virtual screen, as functional design elements;

providing selecting fields enabling a user to switch between different predefined platforms, in a virtual screen section of the display, which have different operating systems from one another, to visualize the design layout with native design elements in the different platforms in real time without recompiling any design code;

transferring the design layout with the native design elements to the second computing device to natively render the native design elements as a functional prototype application in its interface by using the predefined coded native design elements in the library;

tagging comments to native design elements and collaboratively sharing the tagged comments associated with the native design elements to different computing devices, including a native platform; and transferring the tagged comments in real-time between the native platform and the second computing device using a server to tag the tagged comments to the native design elements on the native platform on the second computing device, wherein changes can be made to the functional prototype application on the second computing device based on the tagged comments without the need to recode the native design elements, wherein the selecting fields include a first scrollable selecting field, in the virtual screen section, to select among different operating systems and a second scrollable selecting field, in the virtual screen section and separate from the first scrollable selecting field, to select among different device types having different resolutions from one another; and wherein the library section and the virtual screen section are located adjacent to one another and configured to permit a user to select, drag and drop the pre-defined native design elements from the library section to the virtual screen section based on selections made by the user in the first scrollable selecting field and the second scrollable selecting field in the virtual screen section, further comprising providing layering of the native design elements from the library section on top of each other on different pages in a manner to provide the user with the ability to click through the application so that the user can observe any aspect or interactions of the design layout through multiple pages or click-throughs for a particular application, based upon selections made by the user utilizing the first and second scrollable fields in the virtual screen section.

15. The method of claim 14, wherein the step of transferring is provided by a service provider.

16. The method of claim 14, wherein properties of the native design elements are selectively customizable for different platforms, and wherein the selecting fields enable the user to also switch between different types of devices in real time without having to recompile any design code.

17. A computer system for generating functional prototype applications in different platforms without rewriting code for each different platform comprising:
a hardware memory device that stores program instructions; and
a processor that executes the program instructions and causes the computer system to:
design, modify, and update design layouts for prototype applications using a library of native design elements, which are visually rendered with their related functionality in a relative layout on a canvas of different platforms, wherein the design layouts, including the native design elements, may be selectively rendered for any of the different platforms, which have different operating systems from one another, in real time without recompiling any design code;

navigate between different pages of the prototype applications;

publish the design layouts for the prototype applications with the native design elements; and associate comments by a user with specific native design elements for which they pertain and share the comments amongst different computing devices including a native computing device which renders the native design elements as a functional prototype application, wherein changes can be made in real-time to the functional prototype application based on the tagged comments without the need to recode the native design elements, and wherein, when a third party user selects the comments made by the user regarding the specific native design elements, after the comments are shared, the third party user will automatically be brought to the specific native design elements which the comments pertain to, and wherein the library of native design elements is pre-coded with an XML based language configured to separate document content from document presentation of a document, further comprising program instructions to cause the computer system to provide a display including a virtual screen section to display the design layouts, a library section to display the native design elements and a field services section configured to provide different functionality, accessible through different tabs, including a project tab configured to allow a designer to define and save projects and to create a new project which includes multiple forms or pages for a mobile device; and program instructions to cause the computer system to provide, using the project tab in the field services section, layering of the native design elements on top of each other on different pages in the virtual screen section in a manner to provide the user with the ability to click through the prototype applications so that the user can observe any aspect or interactions of the design layouts through multiple pages or click-throughs for a particular prototype application, wherein the native design elements are selectively rendered for any of the different platforms using selecting fields including a first scrollable selecting field to select among different operating systems and a second scrollable selecting field, separate from the first scrollable selecting field, to select among different device types having different resolutions from one another, and wherein the library section and the virtual screen section are located adjacent to one another and configured to permit a user to select, drag and drop the pre-defined native design elements from the library section to the virtual screen section based on selections made by the user in the first scrollable selecting field and the second scrollable selecting field in the virtual screen section.

18. The computer system of claim 17, wherein a processor executes the program instructions to allow a designer to make revisions or modifications to the design layout based on the comments without the need to recode any of the design layout by dropping and dragging the native design elements from the library to the design layout.

\* \* \* \* \*